United States Patent
Yoshida et al.

(10) Patent No.: US 9,829,010 B2
(45) Date of Patent: Nov. 28, 2017

(54) BLOWER DEVICE

(71) Applicant: DENSO CORPORATION, Kariya, Aichi-pref. (JP)

(72) Inventors: Kenji Yoshida, Kariya (JP); Takahiro Iwasaki, Kariya (JP); Yoshihiro Kato, Toyota (JP); Nariaki Horinouchi, Nisshin (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 476 days.

(21) Appl. No.: 14/370,120

(22) PCT Filed: Dec. 25, 2012

(86) PCT No.: PCT/JP2012/008277
§ 371 (c)(1),
(2) Date: Jul. 1, 2014

(87) PCT Pub. No.: WO2013/105193
PCT Pub. Date: Jul. 18, 2013

(65) Prior Publication Data
US 2014/0334917 A1    Nov. 13, 2014

(30) Foreign Application Priority Data
Jan. 12, 2012    (JP) .................................. 2012-004332

(51) Int. Cl.
*F01D 25/16*    (2006.01)
*F04D 29/54*    (2006.01)
(Continued)

(52) U.S. Cl.
CPC ............ *F04D 29/541* (2013.01); *B60K 11/06* (2013.01); *F01P 5/06* (2013.01); *F04D 29/164* (2013.01);
(Continued)

(58) Field of Classification Search
CPC ...... F01D 5/225; F01D 17/162; F04D 29/326; F04D 29/4226
(Continued)

(56) References Cited

U.S. PATENT DOCUMENTS 3,976,393 A * 8/1976 Larson .................. F04D 29/664
415/119
3,980,912 A * 9/1976 Panza ...................... H02K 9/14
181/202
(Continued)

FOREIGN PATENT DOCUMENTS

JP    H095053575 A    5/1997
JP    2004-513300     4/2004
(Continued)

OTHER PUBLICATIONS

Office Action dated Nov. 3, 2015 in corresponding Chinese Application No. 201280066662.8 with English translation.
(Continued)

*Primary Examiner* — Craig Kim
*Assistant Examiner* — Jason Mikus
(74) *Attorney, Agent, or Firm* — Harness, Dickey & Pierce, P.L.C.

(57) ABSTRACT

A blower device includes an axial flow fan having blades to blow air, and a fan shroud that includes a cylindrical portion surrounding an outer circumference of the fan at a distance from the outer circumference, and an air guiding portion guiding air drawn by the fan. The fan shroud includes a short end part shorter in distance to the outer circumference of the fan than another part in an outer end portion of the fan shroud, and a protruding end part provided at a position advanced in a rotational direction from the short end part, protruding upstream in a flow of the drawn air more than the fan and protruding outward of the air guiding portion.

(Continued)

Accordingly, the blower device which includes the fan shroud capable of reducing rotational noise can be provided.

18 Claims, 7 Drawing Sheets

(51) Int. Cl.
*F04D 29/16* (2006.01)
*F04D 29/52* (2006.01)
*B60K 11/06* (2006.01)
*F01P 5/06* (2006.01)
*F04D 29/66* (2006.01)
*F04D 29/32* (2006.01)

(52) U.S. Cl.
CPC ......... *F04D 29/326* (2013.01); *F04D 29/526* (2013.01); *F04D 29/667* (2013.01)

(58) Field of Classification Search
USPC ...................................... 415/173.6
See application file for complete search history.

(56) References Cited

U.S. PATENT DOCUMENTS

| | | | | |
|---|---|---|---|---|
| 4,152,094 A * | 5/1979 | Honda | ................ | F04D 29/164 415/119 |
| 4,692,091 A * | 9/1987 | Ritenour | ............... | F04D 29/526 415/119 |
| 5,215,433 A | 6/1993 | Weiland et al. | | |
| 5,489,186 A | 2/1996 | Yapp et al. | | |
| 6,309,176 B1 * | 10/2001 | Periyathamby | .......... | F01P 11/12 415/119 |
| 6,896,095 B2 * | 5/2005 | Shah | ......................... | F01P 5/06 181/198 |
| 2003/0026699 A1 * | 2/2003 | Stairs | .................... | F04D 29/582 416/192 |
| 2003/0161728 A1 | 8/2003 | Cho et al. | | |
| 2007/0280827 A1 | 12/2007 | Stevens et al. | | |
| 2007/0280829 A1 | 12/2007 | Stevens et al. | | |

FOREIGN PATENT DOCUMENTS

| | | |
|---|---|---|
| JP | 3928083 B2 | 6/2007 |
| JP | 2009539033 A | 11/2009 |
| JP | 2010222974 A | 10/2010 |

OTHER PUBLICATIONS

International Search Report and Written Opinion (in Japanese with English Translation) for PCT/JP2012/008277, dated Apr. 9, 2013; ISA/JP.

* cited by examiner

BLOWER DEVICE

CROSS REFERENCE TO RELATED APPLICATIONS

This application is a U.S. National Phase Application under 35 U.S.C. 371 of International Application No. PCT/JP2012/008277 filed on Dec. 25, 2012 and published in Japanese as WO 2013/105193 A1 on Jul. 18, 2013. This application is based on Japanese Patent Application No. 2012-004332 filed on Jan. 12, 2012. The disclosures of all of the above applications are incorporated herein by reference.

TECHNICAL FIELD

The present disclosure relates to a blower device including a fan shroud disposed to surround an outer side of an axial flow fan.

BACKGROUND ART

In Patent Document 1, a device which includes an axial flow fan is described as a blower device used in cooling of a radiator of an automobile. In this axial flow fan, pressure fluctuation caused by a whole shape of a fan shroud is found to contribute to noise generation.

Thus, the blower device of Patent Document 1 includes a fan shroud provided with a cylindrical portion disposed a predetermined distance away from the fan on a radially outer side of the fan and a pressure-fluctuation restriction space having a fan shape centered at a center point of the fan. The pressure-fluctuation restriction space is formed by recessing the cylindrical portion to have the fan-shaped recess part. According to the shape of the fan shroud, the above-described pressure fluctuation can be moderated, and noise to be generated can be reduced.

The blower device described in Patent Document 1 includes the fan shroud having a rectangular shape and surrounding the fan having a circular shape. Hence, there are a long part and a short part in distance between an end part of the fan and an outer end part of the fan shroud, for example. Thus, an air amount drawn into the fan may be smaller in the short part than in the long part. Therefore, since the drawn air amount is uneven in a whole circumference of the end part of the fan, unequal air flows may be produced in the whole circumference of the fan, and so-called rotational noise that is noise associated with rotation of the fan may be generated.

Especially, in a vehicle driven by a motor, such as a hybrid vehicle or an electric vehicle, large noise such as engine sound is hardly generated or is not generated at all. Thus, the rotational noise of the fan mounted on the vehicle is easily transmitted to circumference of the vehicle recognizably, and may cause a noise problem of circumferential environment.

PRIOR ART DOCUMENT

Patent Document

Patent Document 1: JP 2010-222974 A

SUMMARY OF THE INVENTION

In consideration of the above-described points, it is an objective of the present disclosure to provide a blower device including a fan shroud capable of reducing rotational noise.

According to a first aspect of the present disclosure, a blower device includes a fan being an axial flow type and having blades to blow air, and a fan shroud. The fan shroud includes a cylindrical portion surrounding an outer circumference of the fan at a distance from the outer circumference, and an air guiding portion that guides air drawn by the fan. The fan shroud further includes a short end part shorter in distance to the outer circumference of the fan than another part in an outer end portion of the fan shroud, and a protruding end part provided at a position shifted from the short end part in a rotational direction of the fan, and located on an upstream side of the fan in a flow direction of the drawn air and on an outer side of the air guiding portion.

Generally, in the air guiding portion located on an inner side of the outer end portion of the fan shroud, since the short end part is shorter in distance to the outer circumference of the fan than another part, a flow rate of air drawn along the air guiding portion from the outer circumference of the fan is lower in the short end part than the another part. Moreover, a flow direction of air flowing into the fan is varied depending on the distance between the inner side of the outer end portion of the fan shroud and the outer circumference of the fan. Thus, the flow rate of the air drawn into the outer circumference of the fan may be low in a part of the whole outer circumference of the fan, and the flow direction toward the fan may also become uneven in a circumferential direction. These may cause so-called rotational noise that is noise associated with rotation of the fan. The rotational noise increases remarkably due to an interference phenomenon between a high-speed rotating body and an ambient air, and the rotational noise has a single frequency component and an especially high sound pressure.

According to the first aspect of the present disclosure, an air flow drawn along the protruding end part can be provided. A flow rate of the air drawn into the fan from the protruding end part can be increased, and flows of air into the fan can be oriented toward a center of the fan and be even in the circumferential direction. The inflow direction and the air inflow rate can be made to be more even in the whole circumference of the fan. Therefore, the blower device including the fan shroud capable of reducing the rotational noise can be provided.

According to a second aspect of the present disclosure, the short end part may be the shortest part in distance to the outer circumference in the fan of the outer end portion of the fan shroud. In this case, the protruding end part is formed at a position advanced in the rotational direction of the fan from the short end part that is most likely to cause the rotational noise. Thus, an air flow rate toward the outer circumference of the fan can be increased effectively. Moreover, since the protruding end part restricts increase of interference between the blades of the fan and the inflow air at the position advanced from the short end part in the rotational direction of the fan, the air inflow directions toward the fan also are oriented toward the center of the fan and become even in the circumferential direction. Hence, even when the number or the size of the protruding end parts provided in the fan shroud is reduced, the blower device capable of reducing the rotational noise effectively can be provided.

According to a third aspect of the present disclosure, the protruding end part may include an inner wall surface having a curved shape on a side toward the fan. In this case, when an air is drawn from the front into an inner side of the protruding end part, an air flow along the curved shape of the inner wall surface of the protruding end part can be provided. Thus, the drawn air can be introduced into the outer circumference of the fan smoothly. Accordingly, a flow rate of air introduced into the outer circumference of the fan via the protruding end part can be increased effectively. The correction of unevenness in inflow rate into the fan can be facilitated, and drastic reduction of the rotational noise can be achieved.

According to a fourth aspect of the present disclosure, a blower device includes a fan being an axial flow type and having blades to blow air, and a fan shroud. The fan shroud includes a cylindrical portion surrounding an outer circumference of the fan at a distance from the outer circumference, and an air guiding portion that guides air drawn by the fan. The fan shroud further includes a short end part shorter in distance to the outer circumference of the fan than another part in an outer end portion of the fan shroud, and a shield plate located at a position shifted from the short end part in a rotational direction of the fan and on a downstream side of the fan in a flow direction of the drawn air. The shield plate extends by a predetermined length from the cylindrical portion toward a center of the fan.

The followings are found by earnest study of the inventors. In the fan shroud of the blower device, a flow rate of air blown out of the outer circumference of the fan is higher in the position advanced in the rotational direction of the fan from a position corresponding to the short end part than a flow rate of air in another position. Since the air flow rate of air blown in this position is high, the flow rate of the blown air is uneven in the whole outer circumference of the fan. Such uneven distribution of the flow rate of the blown air becomes a factor that causes generation of the rotational noise.

According to the fourth aspect of the present disclosure, the fan shroud includes the shield plate located at the position shifted from the short end part in the rotational direction of the fan and on the downstream side of the fan in the flow direction of the drawn air. By an effect of the shield plate to restrict the blown air, a flow rate of air blown out of the fan can be limited at the position advanced from the short end part in the rotational direction of the fan. According to the reduction of the flow rate of the blown air by the shield plate, the flow rate of air blown out of the outer circumference of the fan can be made to be more even, and the flow rate of the blown air in the circumferential direction can be further balanced. Therefore, the blower device including the fan shroud capable of reducing the rotational noise can be provided. Additionally, according to the blower device, the rotational noise can be reduced without increase in size such as height dimension of the fan shroud.

According to a fifth aspect of the present disclosure, the short end part may be the shortest part in distance to the outer circumference of the fan in the outer end portion of the fan shroud. In this case, the shield plate is provided on the downstream of the fan and at a position shifted in the rotational direction of the fan from the short end part that is most likely to cause the rotational noise. Thus, in this position, a flow rate of air blown out of the outer circumference of the fan can be decreased effectively. Hence, even when the number or the size of the shield plates formed in the fan shroud is reduced, the rotational noise can be reduced effectively. As long as the rotational noise can be reduced, the number and the size of the shield plates can be restricted. Therefore, a flow resistance on the downstream side of the fan can be limited.

EMBODIMENTS FOR EXPLOITATION OF THE INVENTION

Figure 1:
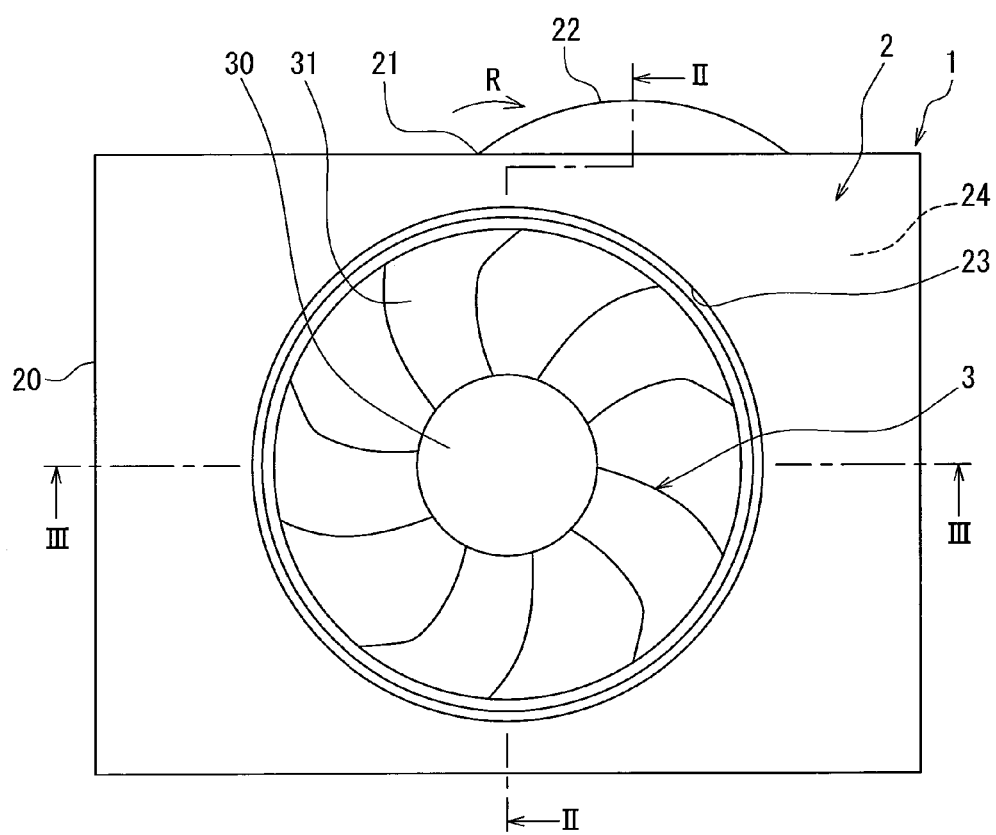
FIG. 1 is a back view showing a blower device according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
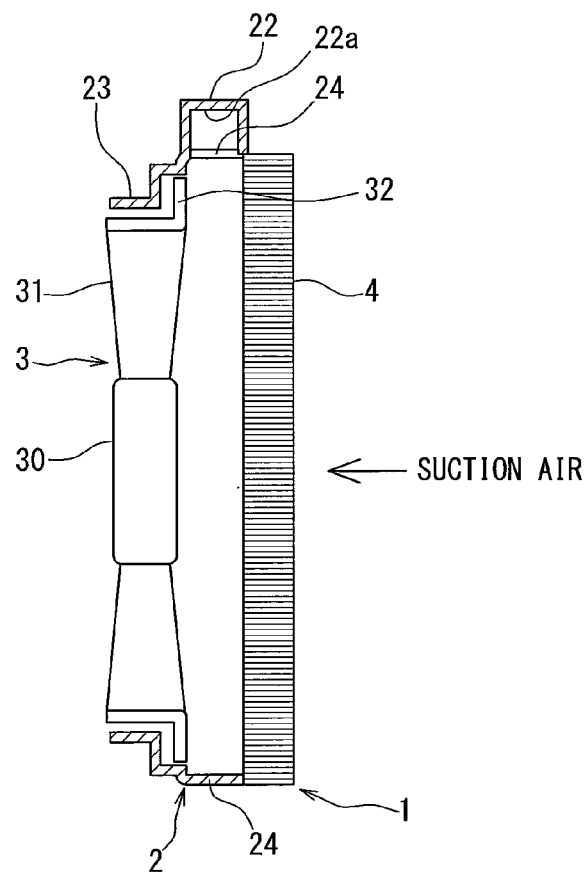
FIG. 2 is a sectional view taken along a line II-II of FIG. 1.
Figure 3:
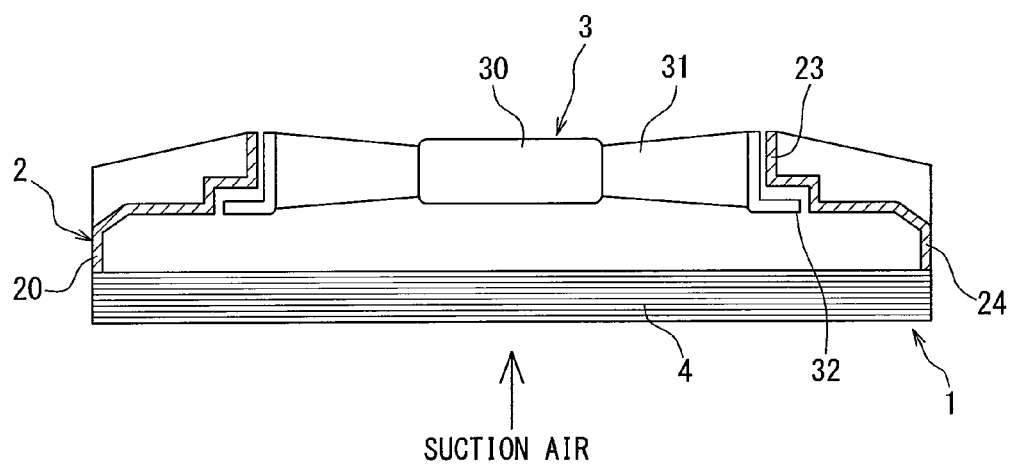
FIG. 3 is a sectional view taken along a line III-Ill of FIG. 1.

A blower device 1 of a first embodiment of the present disclosure will be described with reference to FIGS. 1 to 4. In the first embodiment, a device will be described as an example of the blower device, and the device conveys air to a radiator that is disposed in a vehicle to cool an engine, for example. FIG. 1 is a back view illustrating the blower device 1 of the first embodiment. FIG. 2 is a sectional view showing a part of a fan shroud 2 when a sectional surface taken along a line II-II of FIG. 1 is viewed in an arrow direction. FIG. 3 is a sectional view showing a part of the fan shroud 2 when a sectional surface taken along a line III-III of FIG. 1 is viewed in an arrow direction. In FIGS. 1 to 3, a motor and a motor stay which drive a fan 3 to rotate are not shown. An arrow in the drawings shows a flow direction of air suctioned by the blower device 1.

The blower device 1 includes the fan 3 that is single and an axial flow type, and the fan shroud 2 supporting the motor which drives and rotates the fan 3 and guiding air drawn by the fan 3. As shown in FIG. 1, the fan 3 includes a boss portion 30 as a center of rotation, multiple blades 31 extending radially from the boss portion 30. One ends of the multiple blades 31 are connected to the boss portion 30, and the other ends of the multiple blades 31 are connected to a circular ring portion 32. The fan 3 includes the motor that gives a rotary drive force. The motor includes a motor shaft as a rotational axis. The motor shaft and the boss portion 30 are connected to each other by a fixing member. The motor is electrically driven and is configured, for example, by a ferrite-magnetic type direct-current motor. A harness portion is connected to the motor to supply electric power to an armature, and the harness portion is connected to a battery of the vehicle via a connector or the like.

The fan 3 is disposed on a downstream side of a radiator 4 in a flow of suction air. Accordingly, the fan 3 draws outside air from a grill on a front surface of the vehicle toward the engine by the rotary drive of the motor.

The fan shroud 2 is a member supporting the fan 3 so as to cover the fan 3 that provides cooling air to the radiator 4 used for radiating heat of engine coolant. The fan shroud 2 supports and fixes the motor of the fan 3, while the fan shroud 2 is attached to the radiator 4 integrally. For example, the fan shroud 2 includes a lower attachment portion in a lower part of the fan shroud 2 in a vertical direction, and an upper attachment portion in an upper part of the fan shroud 2 in the vertical direction. Each of the lower attachment portion and the upper attachment portion has a through hole through which a screw or the like can be inserted. By screwing the lower attachment portion and the upper attachment portion to respective female screw portions provided on the radiator 4, the fan shroud 2 is attached to the radiator 4 integrally.

The fan shroud 2 has a horizontally-long rectangular shape. The fan shroud 2 has a structure in which the single fan 3 can be disposed, and the fan 3 lets cooling air pass through a core portion of the radiator 4. The fan shroud 2 includes a motor attachment portion to which the motor of the fan 3 is attached, a cylindrical portion 23 surrounding an outer circumference of the fan 3 at a distance from the outer circumference, and an air guiding portion 24 which guides air drawn by the fan 3. The cylindrical portion 23 has a circular shape encircling an outer circumference of five blades 31 (i.e. the outer circumference of the fan) which extend radially from the boss portion 30 of the fan 3. The cylindrical portion 23 is formed integrally with a radially end part of the motor stay, and supports the motor attachment portion via the motor stay.

As shown in FIGS. 2 and 3, the fan shroud 2 includes the air guiding portion 24 having a shape tilted or curved smoothly between the cylindrical portion 23 and an outer end portion of the fan shroud 2. The air guiding portion 24 functions to draw the outside air efficiently to an entire area of the core portion of the radiator 4. A cylindrical part formed by the air guiding portion 24 extending from the outer end portion of the fan shroud 2 on a side of the radiator 4 to an inner end portion of the cylindrical portion 23 configures a wind tunnel portion, and contributes to forming of an efficiently-drawn flow of the outside air.

The outer end portion of the fan shroud 2 includes a short end part 21 that is shorter in distance to the outer circumference of the fan 3 than another part in the outer end portion of the fan shroud 2. As shown in FIG. 1, the short end part 21 is a part located on a long side of the outer end portion of the fan shroud 2 having the horizontally-long rectangular shape, and the short end part 21 is shorter in distance to the outer circumference of the fan 3 than a wide end part 20 located on a short side of the outer end portion of the fan shroud 2. In other words, the distance from the wide end part 20 to the outer circumference of the fan 3 is longer than the distance from the short end part 21 to the outer circumference of the fan 3. The short end part 21 is shorter than the wide end part 20 in distance to the cylindrical portion 23, and an area of the air guiding portion 24 between the short end part 21 and the cylindrical portion 23 is quite small. The wide end part 20 is longer than the short end part 21 in distance to the outer circumference of the fan 3 or distance to the cylindrical portion 23. An area of the air guiding portion 24 between the wide end part 20 and the cylindrical portion 23 is larger than the area of the air guiding portion 24 between the short end part 21 and the cylindrical portion 23.

The fan shroud 2 includes a protruding end part 22 formed at a position advanced from the short end part 21 in a rotational direction R of the fan 3. The protruding end part 22 protrudes upstream in the flow of suction air more than the fan 3, and protrudes outward more than the air guiding portion 24. The protruding end part 22 has an inner wall surface 22a having a curved shape on a side toward the fan 3. Moreover, it is preferable that an outer wall surface of the protruding end part 22 also have a curved shape similarly to the inner wall surface 22a located on the side toward to the fan 3. Accordingly, an outside dimension of the fan shroud 2 can be limited. Especially, it is preferable that the short end part 21 be the shortest part in distance to the outer circumference of the fan 3 or to the cylindrical portion 23 in the outer end portion of the fan shroud 2.

The fan shroud 2 is a resin-molded member, and is formed, for example, by injection molding using a predetermined metallic die. The resin-molded member is made of polypropylene resin or the like enhanced in strength by glass fiber or talc material, for example.

The radiator 4 includes the core portion that includes tubes in which a coolant of the engine flows and fins disposed between the tubes. The tubes are arranged in multiple rows such that a longitudinal direction of the tubes is oriented in an up-down direction. The radiator 4 further includes an upper tank and a lower tank to which both end parts of the tubes in the longitudinal direction are connected, respectively.

In the above-described configuration, the coolant from the engine flows into the upper tank through a radiator circuit by driving of a water pump. Subsequently, the coolant flows in the tubes of the core portion from top to bottom, and is cooled via heat exchange with air that is supplied from outside the vehicle by the fan 3. Then, the coolant flows out of the lower tank and returns to the engine.

Figure 4:
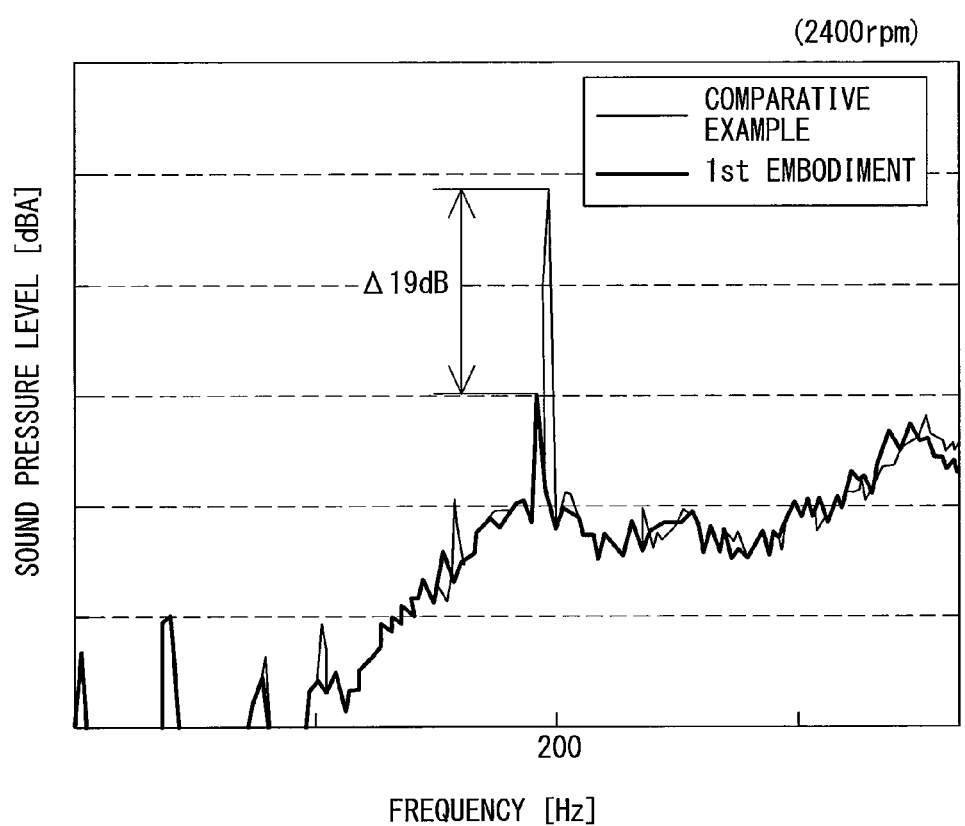
FIG. 4 is a diagram showing results of an experiment comparing noise levels between the blower device according to the first embodiment and a blower device according to a comparative example.

FIG. 4 shows results of experiment comparing measurements of noise level between the blower device 1 of the present embodiment and a blower device of a comparative example. A difference between the blower device 1 and the blower device of the comparative example is that the protruding end part 22 is formed on the fan shroud 2 of the blower device 1. That is, an outer end portion of a fan shroud of the blower device of the comparative example has a horizontally-long rectangular shape without having a protruding end part extending outward on a long side or a short side. As other experimental conditions, each of the blower devices is attached to a radiator integrally. A voltage of 13.5 V is applied to a motor, and noise is measured at a position 1 meter upstream from a fan in a flow direction of suction air. Sound pressure level shown in FIG. 4 is measured by using A-frequency-weighting.

In FIG. 4, the result shown by a bold line is a noise characteristic of the blower device 1, and the result shown by a thin line is a noise characteristic of the blower device of the comparative example. As is obvious from the drawing, a peak value is detected near 200 Hz of frequency (2400 rpm×5 sheets/60) in both cases, and a result a sound pressure level of the blower device 1 is lower by 19 dB than a sound pressure level of the blower device of the comparative example. Since the blower device 1 is capable of reducing the sound pressure level drastically in a low-frequency range within which a sound is likely to be felt as uncomfortable noise for human ear, a rotational sound that is a pure tone and has a potential to provide an uncomfortable feeling to a human can be reduced.

Hereinafter, effects of the blower device of the present embodiment will be described. The blower device 1 includes the fan shroud 2, and the fan shroud 2 includes the axial flow fan 3 having multiple blades 31 that blows air, the cylindrical portion 23 encircling the outer circumference of the fan 3 and being away from the outer circumference, and the air guiding portion 24 that guides air drawn by the fan 3. The fan shroud 2 includes the short end part 21 which is shorter in distance to the outer circumference of the fan 3 than another part in the outer end portion of the fan shroud 2. The fan shroud 2 includes the protruding end part 22 provided at a position advanced from the short end part 21 in the rotational direction R of the fan 3. The protruding end part 22 protrudes upstream in a drawn air flow more than the fan 3, and protrudes outward more than the air guiding portion 24.

According to this configuration, since the fan shroud 2 includes the protruding end part 22 which protrudes upstream in a drawn air flow more than the fan 3 and protrudes outward more than the air guiding portion 24 at a position advanced from the short end part 21 in the rotational direction R of the fan 3, an air flow drawn into the outer circumference of the fan 3 along the protruding end part 22 can be made. An air drawing direction from the protruding end part 22 into the outer circumference of the fan 3 can be oriented toward the center of the fan 3, and can be made to be even in a circumferential direction. Additionally, due to increase in flow rate of drawn air, the drawn air toward the outer circumference of the fan 3 can be made more even, and the drawn air in the circumferential direction can be further balanced.

In an air guiding portion located on an inner side of an outer end portion of a fan shroud of the comparative example, a flow rate of air drawn from an outer circumference of the fan along the air guiding portion is lower in a short end part than in another part. Therefore, a flow rate of air drawn to the outer circumference of the fan may be partially low in a whole area of the outer circumference of the fan and may become uneven, and accordingly, generation of the rotational noise may be caused. By the blower device 1 of the present embodiment, the generation of the rotational noise due to the uneven flow rate of suction air can be restricted.

Moreover, the short end part 21 is the shortest part in distance to the outer circumference of the fan 3 in the outer end portion of the fan shroud 2. According to this configuration, since the protruding end part 22 is formed at the position advanced in the rotational direction R of the fan 3 from the short end part 21 which is most likely to cause the rotational noise, the flow rate of air drawn into the outer circumference of the fan 3 can be increased effectively. Hence, the rotational noise can be reduced effectively even in a product designed such that the number or the size of the protruding end part 22 formed on the fan shroud 2 is reduced. Further, since the dimension of the fan shroud 2 can be limited, a contribution to miniaturization of the blower device 1 can be made.

The protruding end part 22 is formed such that the inner wall surface 22a on the side toward the fan 3 has a curved shape. According to this configuration, when air is drawn from the front into an inside of the protruding end part 22, an air flow along the curved shape of the inner wall surface 22a of the protruding end part 22 is made. Thus, the drawn air can be introduced into the outer circumference of the fan 3 smoothly. Accordingly, since the flow rate of air introduced into the outer circumference of the fan 3 via the protruding end part 22 can be increased effectively, the unevenness of the flow rate of air drawn into the outer circumference of the fan 3 is remedied, and a contribution to reduction of the rotational noise can be made.

Second Embodiment

Figure 5:
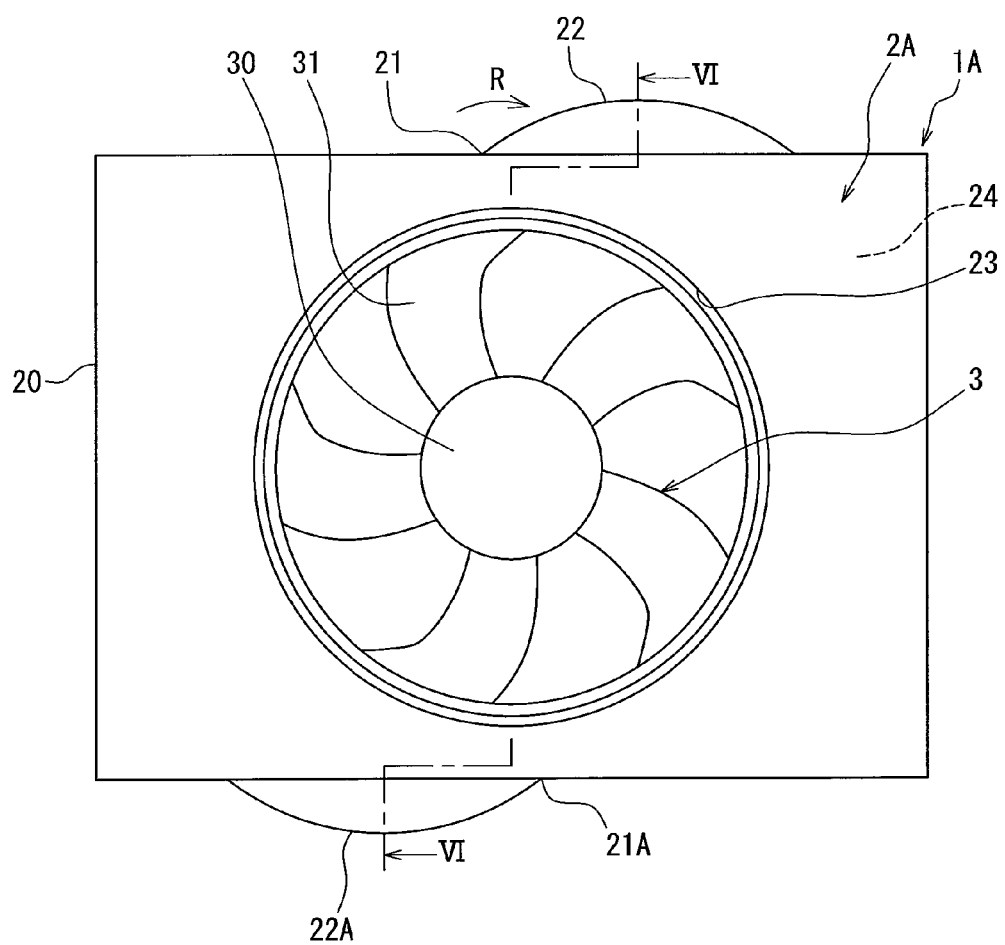
FIG. 5 is a back view showing a blower device according to a second embodiment of the present disclosure.
Figure 6:
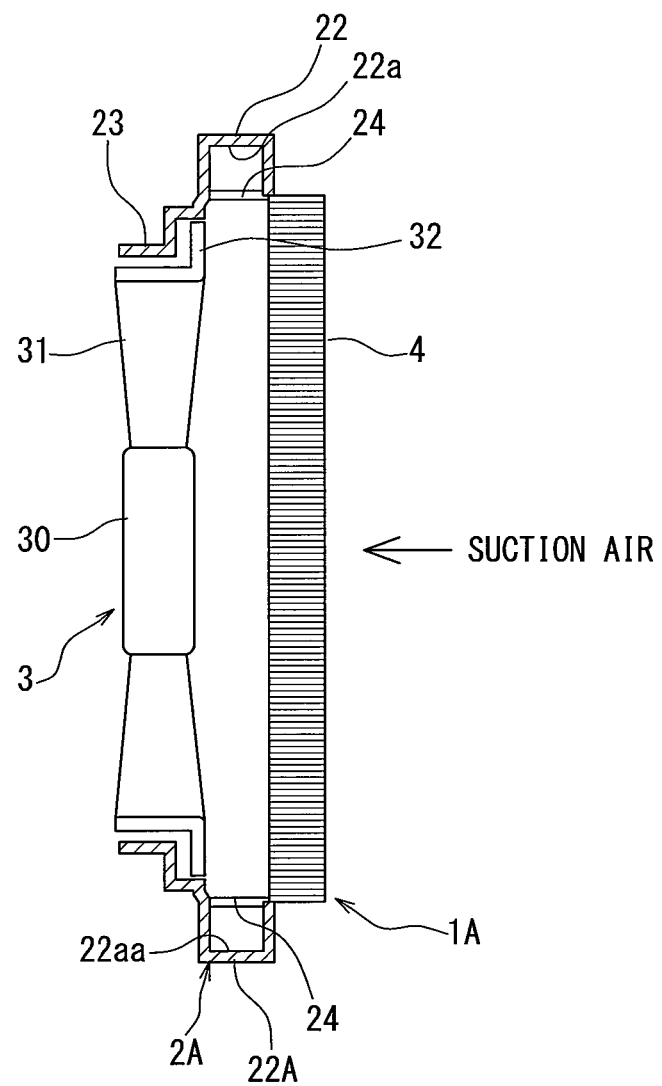
FIG. 6 is a sectional view taken along a line VI-VI of FIG. 5.

A second embodiment is an embodiment changed in configuration of a blower device 1A from the first embodiment. FIG. 5 is a back view illustrating the blower device 1A of the second embodiment. FIG. 6 is a sectional view showing a part of a fan shroud 2A when a sectional surface taken along a line VI-VI of FIG. 5 is viewed in an arrow direction.

As shown in FIGS. 5 and 6, the blower device 1A is different from the blower device 1 of the first embodiment in that the fan shroud 2A includes a protruding end part 22A on an opposite side of an outer end portion of the fan shroud 2A from a protruding end part 22. A configuration that will not be explained is similar to that of the first embodiment, and a different configuration will be explained mainly below.

The fan shroud 2A includes the protruding end part 22A in addition to the protruding end part 22 located in an upper part. The protruding end part 22A is formed at a position advanced in a rotational direction R of a fan 3 from a short end part 21A located in a lower part of the fan shroud 2A. The protruding end part 22A protrudes upstream in a flow of suction air more than the fan 3, and protrudes outward more than an air guiding portion 24. It can be said that the protruding end part 22A is provided at a position point-symmetrical to the protruding end part 22 with respect to a center of the fan 3. The protruding end part 22A has an inner wall surface 22aa on a side toward the fan 3, and the inner wall surface 22a has a curved shape. It is preferable that an outer wall surface of the protruding end part 22A also have a curved shape similarly to the inner wall surface 22aa located on the side toward the fan 3. Especially, it is preferable that the short end part 21A corresponding to a position where the protruding end part 22A also be the shortest part in distance to the outer circumference of the fan 3 or to a cylindrical portion 23 in the outer end portion of the fan shroud 2A.

According to the blower device 1A of the present embodiment, air flows drawn into the outer circumference of the fan 3 along both the protruding end part 22 and the protruding end part 22A can be made by the short end parts 21 and 21A which are formed in the upper part and the lower part of the fan shroud 2A. Accordingly, a flow rate of air flowing into the outer circumference of the fan 3 from the two protruding end parts located on the opposite sides of the outer end portion of the fan shroud 2A increases. Hence, the flow rate of the suction air in the whole outer circumference of the fan 3 can be made more even, and balance correction of the flow rate of suction air in a circumferential direction can be facilitated.

Third Embodiment

Figure 7:
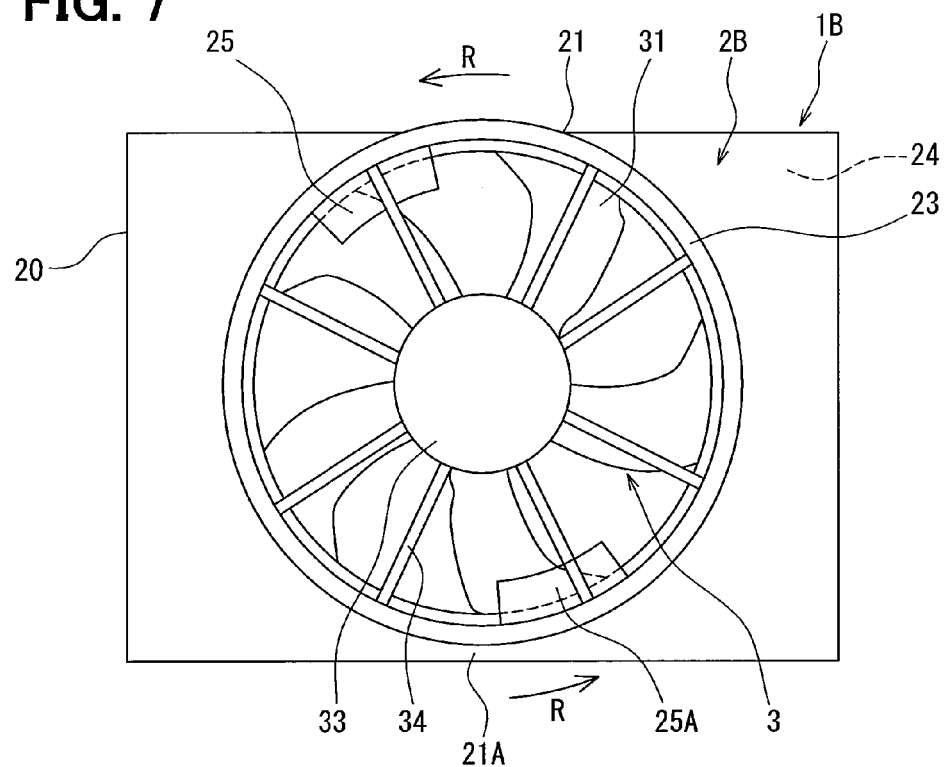
FIG. 7 is a back view showing a blower device according to a third embodiment of the present disclosure.
Figure 8:
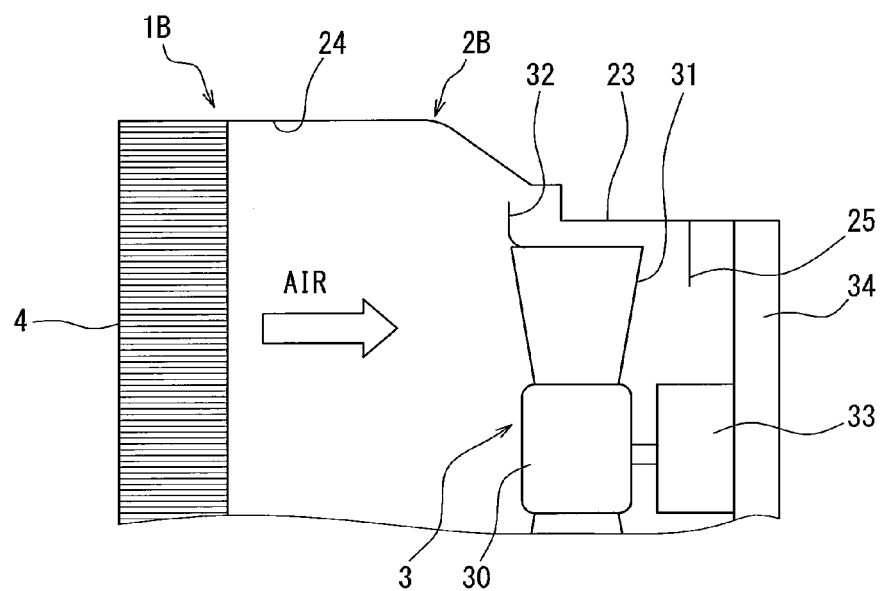
FIG. 8 is a sectional view showing a part of a fan shroud according to the third embodiment.

A third embodiment is an embodiment changed in configuration of a blower device 1B from the first embodiment. FIG. 7 is a back view illustrating a blower device 1B of the third embodiment. FIG. 8 is a sectional view showing a part of a fan shroud 2B of the third embodiment.

As shown in FIGS. 7 and 8, the blower device 1B is different from the blower device 1 of the first embodiment in that shield plates 25 and 25A are provided instead of the protruding end part as a characteristic configuration for reducing rotational noise. A configuration that will not be explained is similar to that of the first embodiment, and a different configuration will be explained mainly below.

As shown in FIGS. 7 and 8, the fan shroud 2B includes the shield plate 25 and the shield plate 25A at positions where a part of flow of air blown by a fan 3 collides with the shield plates 25 and 25A. The shield plate 25 is a plate-shaped member that is located downstream of the fan 3 in a flow of suction air and at a position advanced in a rotational direction R of the fan 3 from a short end part 21. The shield plate 25 extends by a predetermined length from a cylindrical portion 23 toward a center of the fan 3. The shield plate 25A is provided on an opposite-side position from the shield plate 25 or at a position point-symmetrical to the shield plate 25 with respect to the center of the fan 3. The shield plate 25A is located downstream of the fan 3 in the flow of suction air and at a position advanced in the rotational direction R of the fan 3 from a short end part 21A located in a lower part of the fan shroud 2B. The shield plate 25A extends from the cylindrical portion 23 toward the center of the fan 3 to have a predetermined length. The shield plates 25 and 25A have shapes extending in a circumferential direction of the fan 3 to have predetermined length, thereby having rectangular shapes curved along the circumferential direction.

In other words, the shield plates 25 and 25A are provided between a motor stay 34 supporting a motor 33 and a blade 31, and cover at least an end of the rotating blade 31 and a clearance between the end of the blade 31 and the cylindrical portion 23. Accordingly, the shield plates 25 and 25A are used as shield walls that partially block an air flow blown by the fan 3 near an outer circumference of the fan 3.

Figure 9:
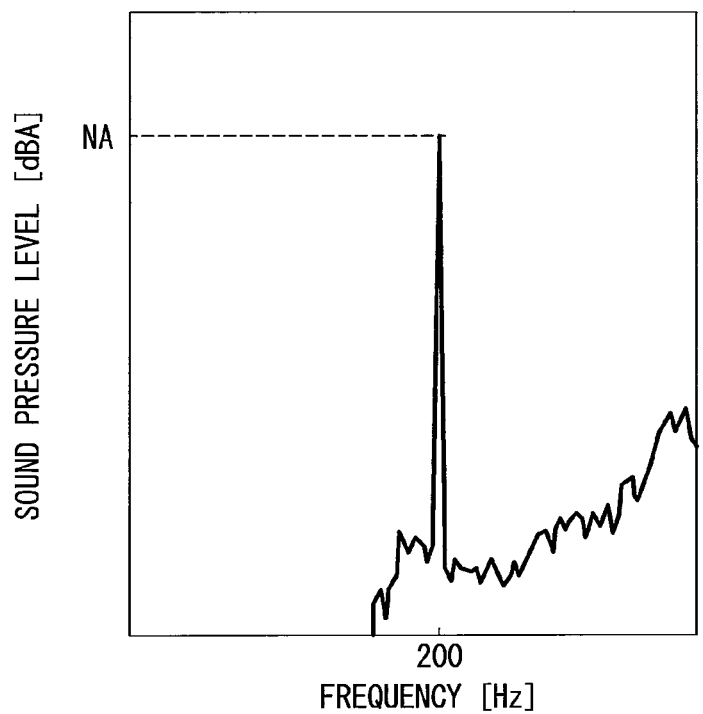
FIG. 9 is a diagram showing a result of an experiment measuring a noise level of a blower device according to a comparative example.
Figure 10:
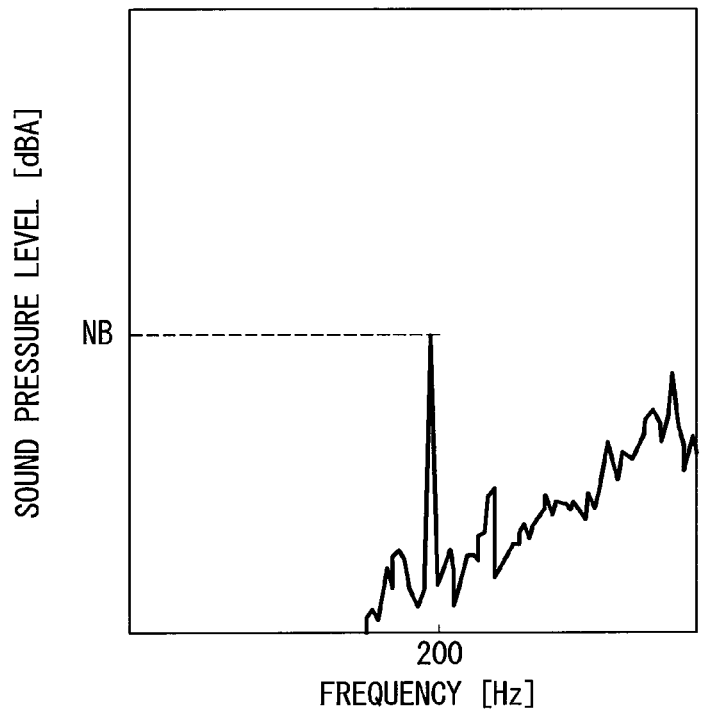
FIG. 10 is a diagram showing a result of an experiment measuring a noise level of the blower device according to the third embodiment.

FIG. 9 shows an experimental result of measurements of noise level with respect to a blower device of a comparative example by the inventors. FIG. 10 shows an experimental result of measurements of noise level with respect to the blower device 1B of the present embodiment by the inventors. A difference between the blower device 1B and the blower device of the comparative example is that the shield plates 25 and 25A are formed in the fan shroud 2B of the blower device 1B. Thus, an outer end portion of a fan shroud of the blower device in the comparative example do not have a shield plate that blocks an air flow on a downstream side of a fan 3. As other experimental conditions, each of the blower devices is attached to a radiator integrally. A voltage of 13.5 V is applied to a motor, and noise is measured at a position 1 meter upstream from a fan in a flow direction of drawn air. Sound pressure level shown in FIGS. 9 and 10 is measured by using A-frequency-weighting.

As is obvious from both drawings, a peak value is detected near 200 Hz of frequency, and a result is obtained that a sound pressure level NB of the blower device 1B is lower by approximately 13 dB than a sound pressure level NA of the blower device of the comparative example. Since the blower device 1B is capable of reducing the sound pressure level drastically in a low-frequency range within which a sound is likely to be felt as uncomfortable noise for human ear, a rotational sound having a potential to provide an uncomfortable feeling to a human can be reduced.

According to earnest study, in the fan shroud according to the blower device of the comparative example, it is recognized by the inventors that a flow rate of air blown out of the outer circumference of the fan rearward is higher in the position advanced in the rotational direction R of the fan 3 from a position corresponding to a short end part than a flow rate of air in another position. It is found that the flow rate of the blown air becomes uneven in the whole outer circumference of the fan because of the high flow rate of the blown air in this position. Such uneven distribution of the flow rate of the blown air causes generation of the rotational noise of the fan.

According to the blower device 1B of the present embodiment, the fan shroud 2B includes the shield plates 25 and 25A located downstream of the fan 3 in the flow of drawn air and at positions advanced in the rotational direction R of the fan 3 from the short end part 21 and 21A. A flow rate of air blown by the fan 3 at the position advanced in the rotational direction R from the short end part 21 or the short end part 21A can be restricted by a blocking effect of the shield plate 25 or the shield plate 25A. According to the reduction of the flow rate of blown air by the shield plate 25 and the shield plate 25A, the flow rate of air blown out of the outer circumference of the fan 3 can be made to be more even, and the flow rate of blown air can be further balanced in the circumferential direction.

The shield plate 25 and the shield plate 25A do not have a structure protruding from the fan shroud 2B in its height direction. Thus, the size of the fan shroud 2B is not increased, and thus enlargement of the device in size can be prevented.

The short end part 21 and the short end part 21A are the shortest parts in distance to the outer circumference of the fan 3 in the outer end portion of the fan shroud 2B. According to this configuration, by providing the shield plate 25 or the shield plate 25A downstream of the fan 3 and at a position advanced in the rotational direction R of the fan 3 from the short end part 21, 21A, the flow rate of air blown out of the outer circumference of the fan 3 at this position can be reduced effectively. Hence, the rotational noise can be reduced effectively even in a product designed such that the number or the size of the shield plates formed in the fan shroud 2B is reduced. Since the dimension of the fan shroud 2B can be restricted, a contribution to the miniaturization of the blower device 1B can be made.

Other Embodiments

The embodiments of the present disclosure are described above. However, the present disclosure is not limited to the above-described embodiments and can be changed variously to be implemented without departing from the scope of the present disclosure.

The blower devices 1, 1A, 1B of the above-described embodiments are devices which provide cooling air to the radiator used for cooling the engine coolant of the vehicle, but the present disclosure is not limitedly applied to the embodiments. For example, the present disclosure can be applied to a device that is disposed in an outdoor unit of an air conditioner or an outdoor unit of a water heater and supplies cooling air. Alternatively, the present disclosure can be applied to a device which provides cooling air to cool a computer or an electronic component, for example.

The blower devices 1, 1A, 1B of the above-described embodiments are disposed downstream of the radiator 4 in the air flow, but the present disclosure is not limited to the embodiments. For example, the blower devices 1, 1A, 1B may be disposed to supply blown air to a heat exchanger or the like.

The blower device 1B of the above-described third embodiment includes the shield plate 25 and the shield plate 25A. However, the blower device may include either one of these. Even one of the shield plates is capable of providing the effect to reduce the above-described rotational noise.

What is claimed is:

1. A blower device comprising:
   a fan being an axial flow type and having blades to blow air; and
   a fan shroud including a cylindrical portion surrounding an outer circumference of the fan at a distance from the outer circumference of the fan, an air guiding portion guiding air drawn by the fan, and an air inlet through which air flows into the air guiding portion in an axial direction of the fan, wherein
   the fan shroud further includes:
      a short end part being the shortest in distance to the outer circumference of the fan from an outer end portion of the fan shroud; and
      a protruding end part provided at a position extending radially outward from the short end part in a rotational direction of the fan, and located between the air inlet of the fan shroud and the fan in the axial direction and on an outer side of the air guiding portion, and
   the protruding end part protrudes outward from an outer edge of the air inlet in a direction perpendicular to a flow direction of air flowing through the air inlet.

2. The blower device according to claim 1, wherein the protruding end part includes an inner wall surface having a curved shape on a side toward the fan.

3. A blower device comprising:
   a fan being an axial flow type and having blades to blow air; and
   a fan shroud including a cylindrical portion surrounding an outer circumference of the fan at a distance from the outer circumference, and an air guiding portion guiding air drawn by the fan, wherein
   the fan shroud further includes:
      a short end part being the shortest in distance to the outer circumference of the fan from an outer end portion of the fan shroud; and
      a shield plate located at a position extending radially inward from the short end part in a rotational direction of the fan and on a downstream side of the fan in a flow direction of the drawn air, the shield plate extending by a predetermined length from the cylindrical portion toward a center of the fan, the shield plate being perpendicular to a flow direction of air flowing in the cylindrical portion, the shield plate having a side surface and a thickness surface, and air being incident upon the side surface.

4. The blower device according to claim 1, wherein the protruding end part is one of two protruding end parts, and
   the two protruding end parts are point-symmetric with respect to a point at a center axis of the fan.

5. The blower device according to claim 1, wherein the protruding end part has an empty space therein.

6. The blower device according to claim 3, wherein the shield plate extends by the predetermined length from the cylindrical portion toward the center of the fan in a direction perpendicular to the flow direction of air flowing in the cylindrical portion, and
   the predetermined length is longer than a clearance between the cylindrical portion and the blades.

7. The blower device according to claim 1, wherein the protruding end part extends form the short end part in the rotational direction of the fan.

8. A blower device comprising:
   an axial flow type fan having a plurality of blades to blow air;
   a fan shroud including a cylindrical portion surrounding an outer circumference of the fan, an air guiding portion guiding air drawn by the fan and an air inlet through which air flows into the air guiding portion in an axial direction of the fan; wherein
   the cylindrical portion is spaced from the outer circumference of the fan;
   the fan shroud includes a short end part and a wide end part, a distance from an outer end of the short end part to the outer circumference of the fan being smaller than a distance from an outer end of the wide end part to the outer circumference of the fan;
   the fan shroud includes a protruding end part extending from the outer end of the short end part in a rotational direction of the fan, the protruding end part is located between the air inlet of the fan shroud and the fan in the axial direction and on an outer side of the air guiding portion; and
   the protruding end part protrudes outward from an outer edge of the air inlet in a direction perpendicular to a flow direction of air flowing through the air inlet.

9. The blower device according to claim 8, wherein the distance from outer end of the short end part to the outer circumference of the fan is the shortest distance from an outer end of the fan shroud to the outer circumference of the fan.

10. The blower device according to claim 8, wherein
    the protruding end part includes an inner wall surface having a curved shape on a side toward the fan.

11. The blower device according to claim 8, wherein the fan shroud includes a shield plate located at a position extending radially inward from the short end part in the rotational direction of the fan and on a downstream side of the fan in the flow direction of the drawn air, the shield plate extending by a predetermined length from the cylindrical portion toward a center of the fan, the shield plate being perpendicular to a flow direction of air flowing in the cylindrical portion, the shield plate having a side surface and a thickness surface, and air being incident upon the side surface.

12. The blower device according to claim 11, wherein
    the shield plate extends by the predetermined length from the cylindrical portion toward the center of the fan in a direction perpendicular to the flow direction of air flowing in the cylindrical portion, and
    the predetermined length is longer than a clearance between the cylindrical portion of the blades.

13. The blower device according to claim 8, wherein
    the protruding end part is one of two protruding end parts, and
    the two protruding end parts are point-symmetric with respect to a point at a center axis of the fan.

14. The blower device according to claim 8, wherein the protruding end part has an empty space therein.

15. A blower device comprising:
    a fan being an axial flow type and having blades to blow air; and
    a fan shroud including a cylindrical portion surrounding an outer circumference of the fan at a distance from the outer circumference of the fan, an air guiding portion guiding air drawn by the fan, and an air inlet through which air flows into the air guiding portion, wherein
the fan shroud further includes:
- a short end part being the shortest in distance to the outer circumference of the fan from an outer end portion of the fan shroud; and
- a protruding end part provided at a position extending radially outward from the short end part in a rotational direction of the fan, and located on an upstream side of the fan in a flow direction of the drawn air and on an outer side of the air guiding portion, the protruding end part is located adjacent to the air inlet and protrudes outward from an outer edge of the air inlet in a direction perpendicular to a flow direction of air flowing through the air inlet, the protruding end part is one of two protruding end parts, and the two protruding end parts are point-symmetric with respect to a point at a center axis of the fan.

16. The blower device according to claim 1, wherein
the protruding end part is one of two protruding end parts, and
the two protruding end parts are located asymmetrically with respect to a center axis of the fan.

17. The blower device according to claim 3, wherein
the protruding end part is one of two protruding end parts, and
the two protruding end parts are located asymmetrically with respect to a center axis of the fan.

18. The blower device according to claim 8, wherein
the protruding end part is one of two protruding end parts, and
the two protruding end parts are located asymmetrically with respect to a center axis of the fan.

* * * * *